United States Patent [19]

Sidler

[11] 3,750,504

[45] Aug. 7, 1973

[54] METHOD FOR THE UNPACKING OF CYLINDRICAL BODIES INTERCONNECTED GROUPWISE BY BANDS, AND DEVICE FOR THE PERFORMANCE THEREOF

[75] Inventor: Werner Sidler, Esslingen, Switzerland

[73] Assignee: Schweizerische Aluminum AG Corporation, Chippis, Switzerland

[22] Filed: Nov. 17, 1971

[21] Appl. No.: 199,570

[30] Foreign Application Priority Data
Dec. 3, 1970  Switzerland...................... 17864/70

[52] U.S. Cl.............................. 83/16, 83/18, 83/27, 83/100, 83/107, 83/171, 83/175, 83/373, 83/925 R
[51] Int. Cl............................ B26d 7/14, B26f 3/12
[58] Field of Search ................... 83/27, 16, 18, 171, 83/175, 100, 107, 373, 371, 926 R, 925 R; 214/305; 221/25, 197

[56] References Cited
UNITED STATES PATENTS
3,686,820  8/1972  Zenger et al.................... 214/305 X
3,129,814  4/1964  Cheh et al. ....................... 221/25 X Primary Examiner—Frank T. Yost
Attorney—E. J. Berry et al.

[57] ABSTRACT

A method for and an apparatus for unpacking a plurality of bodies; the bodies are arranged in a row and are held together by a pair of strips running along the bodies; the strips are welded together between adjacent bodies; the bodies are conveyed to a slide which tensions the strip portion between two bodies by pushing the two bodies apart; one of the two tensioned strip portions is severed and the freed body is rolled off the other strip.

7 Claims, 3 Drawing Figures

Patented Aug. 7, 1973 3,750,504

METHOD FOR THE UNPACKING OF CYLINDRICAL BODIES INTERCONNECTED GROUPWISE BY BANDS, AND DEVICE FOR THE PERFORMANCE THEREOF

The present invention concerns a method for the unpacking of cylindrical bodies, in particular containers, interconnected groupwise by at least one pair of bands which face each other and surround the bodies arranged side by side with their axes parallel and are welded together on both sides of the bodies, and further concerns a device for the performance of the said method.

After a method and a device for the packing of cylindrical bodies, in particular containers, had been developed, industry required a corresponding method for the unpacking of such bodies. The present invention provides the solution to that problem in that the method claimed hereunder consists in that one band of each pair is severed behind the foremost body before the weld as viewed in the movement direction on the bodies, and that the body is subsequently rolled from the unsevered band or bands and passed on.

An embodiment of the present invention is now to be described by way of example with reference to the accompanying drawing, in which.

Figure 3:
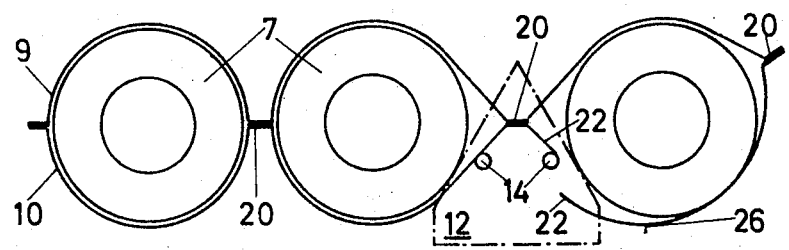

FIG. 3 shwos a top view of a group of three containers, with the severing means indicated by a dash-dotted line.

Figure 1:
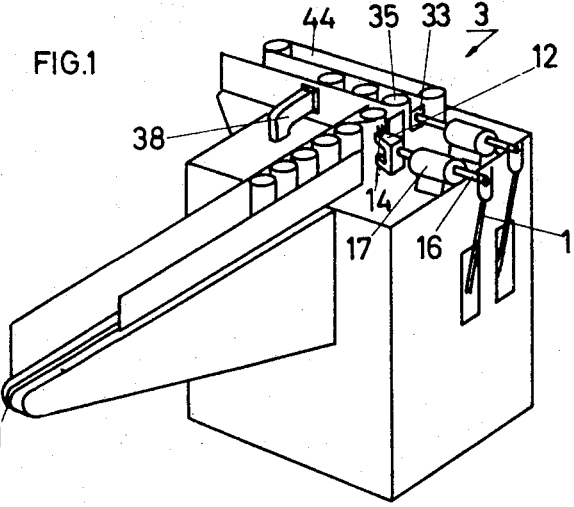
FIG. 1 shows a perspective view of a station for the unpacking of cylindrical containers interconnected groupwise by bands.
Figure 2:
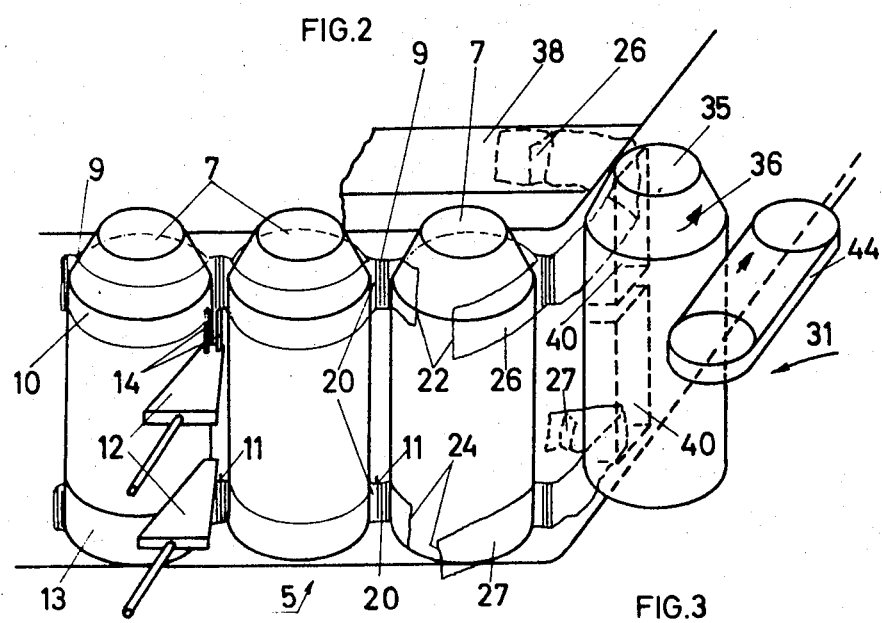
FIG. 2 shows part of the station according to FIG. 1 on an enlarged scale.

The unpacking station 3 shown in FIG. 1 receives the groupwise interconnected cylindrical containers 7 arriving on a conveyor belt 1 and passes them to the first station 5. As shown in FIGS. 2 and 3, the containers 7 are interconnected in the neck zOne by an upper rear band 9 and an upper front band 10, and in the bottom zone by a lower rear band 11 and a lower front band 13. Between the containers 7, each pair of bands is welded together, and the bands are so shrunk that they lie snugly against the containers 7. A laterally arranged spacing slide 12 with two wedge-shaped portions is provided with heatable severing wires 14. The spacing slide 12 is actuated at the rate of container arrival by a push-rod 16 which is supported by a bearing 17 for a reciprocating motion and is actuated by a yoke lever 18. The spacing slide is thus pushed between the containers 7 for the purpose of increasing their distance from each other, as may be seen in FIG. 3 in particular. Once the space between the two foremost containers 7 has been increased accordingly, one of the heated wires 14 severs the front bands 10 and 13 before the weld 20 as viewed in the movement direction of the containers. FIG. 2 shows the severing points 22 and 24 on the upper and lower bands 10 and 13, respectively. As the container group advances, the foremost container 7 passes into a second station 31, in which a tappet 33 actuated in basically the same manner as the spacing slide 12 pushes the container along at right angles. The container is then caught by a conveyor belt 44 and rolled from the rear bands 9 and 11, as indicated by the arrow 36 in FIG. 2. This container 35 thus detaches itself from the two rear bands 9 and 11, which, together with the band portions 26 and 27 of the front bands 10 and 13, are drawn off through suction slots 40 of a suction station 38. The containers 35 are thus unpacked then pass on to their destination.

For the last container of a group, the bands are severed before and behind the last weld 20 but one by both wires 14 being heated. This is necessary to ensure that the last container also is detached from the banding.

I claim:

1. Method for unpacking a plurality of bodies which are arranged close together in a row, with the axes of the bodies being parallel, wherein the bodies are held together by a pair of strips which together circumferentially surround each body and pass along the row of bodies, and which strips are welded together by a weld on both the leading and trailing sides of each body, comprising the steps of:
   tensioning the strips at a weld by pushing apart the neighboring bodies on both sides of the weld;
   severing one of the tensioned strips between neighboring bodies, behind the leading body of the neighboring bodies and before the weld between the neighboring bodies, which thereby frees the leading body;
   rolling the leading body off the remaining unsevered strip.

2. Method according to claim 1, characterized in that the strips are removed by suction.

3. Device for unpacking a plurality of bodies which are arranged close together in a row, with the axes of the bodies being parallel, wherein the bodies are held together by a pair of strips which together circumferentially surround each body and pass along the row of bodies, and which strips are welded together by a weld on both the leading and trailing sides of each body; said device comprising:
   a conveyor for feeding bodies which are held together by the strips;
   a slide movable between neighboring bodies and shaped and positioned to contact them, said slide being shaped to move the neighboring bodies apart when it is moved between them, thereby to tension the strips between the neighboring bodies;
   means for severing one of the tensioned strips;
   deflecting means for engaging each body after a strip holding it has been severed and for then rolling the freed body from the other unsevered strip.

4. Device according to claim 3, wherein said severing means comprises a heatable wire.

5. Device according to claim 3, wherein said severing means is so positioned as to sever a strip behind the leading body of the neighboring bodies and before the weld between the neighboring bodies, which thereby frees the leading body.

6. Device according to claim 3, wherein said deflecting means comprises a conveyor belt positioned to engage the periphery of a body after a strip holding that body is severed, and means for rotating said conveyor belt to rotate that body and roll it from the unsevered other strip.

7. Device according to claim 3, further comprising a suction station having suction apertures over which the body is rolled after the strip is severed; said suction station including means for drawing off the removed severed strip from which the body is being rolled.

* * * * *